United States Patent
Hull et al.

(10) Patent No.: US 10,519,406 B2
(45) Date of Patent: Dec. 31, 2019

(54) TREATMENT OF SULFIDE SCALES

(71) Applicant: Saudi Arabian Oil Company, Dhahran (SA)

(72) Inventors: Katherine Leigh Hull, Houston, TX (US); Brent Cooper, Stafford, TX (US)

(73) Assignee: Saudi Arabian Oil Company, Dhahran (SA)

( * ) Notice: Subject to any disclaimer, the term of this patent is extended or adjusted under 35 U.S.C. 154(b) by 35 days.

(21) Appl. No.: 15/693,612

(22) Filed: Sep. 1, 2017

(65) Prior Publication Data

US 2018/0142190 A1 May 24, 2018

Related U.S. Application Data

(60) Provisional application No. 62/382,558, filed on Sep. 1, 2016.

(51) Int. Cl.
| | | |
|---|---|---|
| *C11D 11/00* | (2006.01) | |
| *C10G 75/04* | (2006.01) | |
| *C11D 7/10* | (2006.01) | |
| *F17D 3/12* | (2006.01) | |

(52) U.S. Cl.
CPC .......... *C11D 11/0041* (2013.01); *C10G 75/04* (2013.01); *C11D 7/10* (2013.01); *F17D 3/12* (2013.01)

(58) Field of Classification Search
None
See application file for complete search history.

(56) References Cited

U.S. PATENT DOCUMENTS

| | | | |
|---|---|---|---|
| 3,284,281 A | 11/1966 | Thomas | |
| 3,807,557 A | 4/1974 | Miller | |
| 3,926,575 A | 12/1975 | Meyers | |
| 3,996,062 A * | 12/1976 | Frost | C02F 5/14 134/2 |
| 4,043,885 A | 8/1977 | Yen et al. | |
| 4,289,639 A | 9/1981 | Buske | |
| 4,324,560 A | 4/1982 | Fonseca | |
| 4,381,950 A | 5/1983 | Lawson | |
| 4,594,170 A | 6/1986 | Brown et al. | |
| 4,640,692 A | 2/1987 | Audeh | |
| 5,224,543 A * | 7/1993 | Watkins | C09K 8/528 166/279 |
| 6,138,760 A | 10/2000 | Lopez et al. | |
| 6,488,091 B1 | 12/2002 | Weaver | |
| 6,494,263 B2 * | 12/2002 | Todd | C09K 8/08 166/300 |
| 6,866,048 B2 | 3/2005 | Mattox | |
| 6,989,391 B2 | 1/2006 | Funkhouser | |
| 8,851,177 B2 | 10/2014 | Wigand | |
| 8,865,482 B2 | 10/2014 | Wang et al. | |
| 8,936,089 B2 | 1/2015 | Wigand | |
| 9,834,721 B2 | 12/2017 | Chang et al. | |
| 9,863,231 B2 | 1/2018 | Hull et al. | |
| 2007/0298979 A1 | 12/2007 | Perry et al. | |
| 2008/0070806 A1 | 3/2008 | Lin et al. | |
| 2009/0143252 A1 * | 6/2009 | Lehmann | C09K 8/532 507/90 |
| 2009/0313772 A1 | 12/2009 | Talley | |
| 2010/0010106 A1 | 1/2010 | Crews | |
| 2010/0276142 A1 | 11/2010 | Skildum et al. | |
| 2012/0247774 A1 | 10/2012 | Li et al. | |
| 2013/0056213 A1 | 3/2013 | Medvedev et al. | |
| 2013/0160994 A1 * | 6/2013 | Alsop | E21B 43/16 166/246 |
| 2014/0045732 A1 | 2/2014 | Mazyar | |
| 2014/0374104 A1 | 12/2014 | Kushal | |
| 2016/0362965 A1 | 12/2016 | Parlar | |
| 2017/0066959 A1 | 3/2017 | Hull et al. | |
| 2018/0112126 A1 | 4/2018 | Yang et al. | |

FOREIGN PATENT DOCUMENTS

| | | |
|---|---|---|
| WO | 2004/005435 | 1/2004 |
| WO | 2013/149122 | 10/2013 |

OTHER PUBLICATIONS

International Search Report and Written Opinion of the International Searching Authority issued in International Application No. PCT/US2016/049958 dated Nov. 23, 2016; 10 pages.
Hydraulic Fracturing Fluid Product Component Information Disclosure; 2 pages.
Montgomery, "Chapter 2: Fracturing Fluid Components," Intech open science | open minds, Montgomery, 2013, 21 pages.
Daneshy, "Hydraulic Fracturing to Improve Production," Tech 101, TheWayAhead, vol. 6, No. 3, Oct. 2010, 4 pages.
Brochard et al., "Fracture Properties of Kerogen and Importance for Organic-Rich Shales," Annual World Conference on Carbon (Carbon 2013), Jul. 2013, 5 pages.
Wang et al., "Iron Sulfide Scale Dissolvers: How Effective Are They?", SPE 168063, Society of Petroleum Engineers 2013; pp. 22.
Gulf Cooperation Council Examination Report issued in GCC Application No. GC 2016-31980 on Sep. 24, 2018, 4 pages.
International Search Report and Written Opinion issued in International Application No. PCT/US2017/049866 dated Dec. 1, 2017; 11 pages.
Gulf Cooperation Council Examination Report issued in GCC Application No. GC 2016-31980 on Jan. 19, 2019.

* cited by examiner

*Primary Examiner* — Jeffrey D Washville
(74) *Attorney, Agent, or Firm* — Fish & Richardson P.C.

(57) ABSTRACT

Treating a sulfide scale includes contacting the sulfide scale with an oxidizing composition that includes a first oxidizer and a second oxidizer.

13 Claims, No Drawings

TREATMENT OF SULFIDE SCALES

CROSS-REFERENCE TO RELATED APPLICATION

This application claims the benefit of U.S. Patent Application Ser. No. 62/382,558 entitled "TREATMENT OF SULFIDE SCALES" filed on Sep. 1, 2016, which is incorporated by reference herein in its entirety.

TECHNICAL FIELD

This document relates to the treatment of scales, such as iron sulfide scales, during oil and gas production.

BACKGROUND

Sulfide scales, such as iron sulfide, lead sulfide, and zinc sulfide scales, are a problem in subterranean environments, as they grow over time in sour gas wells. Iron sulfide scale forms downhole as a result of the reaction between iron and $H_2S$. Iron sulfide has several forms including pyrite ($FeS_2$), pyrrhotite ($Fe_7S_8$), troilite (FeS), greigite ($Fe_2S_4$), and mackinawite ($Fe_9S_8$), and marcasite. The potential sources of $H_2S$ include sulfate-reducing bacteria, thermo-chemical sulfur reduction, thermal decomposition of organosulfur compounds, acid treatment of sour wells, and hydrolysis of metal sulfides. The potential sources of iron include formation brine, well tubulars, and downhole corrosion. The result is iron sulfide scale deposits within the well which, over time, adversely affect production operations. For example, some Khuff gas wells in Saudi Arabia have experienced an estimated production loss of 7 million standard cubic feet per day (MMscfd). In addition, scale deposits limit access to wells for surveillance or intervention.

SUMMARY

Provided in this disclosure is a method for treating sulfide scale. The method includes contacting the sulfide scale with an oxidizing composition that includes a first oxidizer and a second oxidizer.

In some embodiments, the sulfide scale is an iron sulfide scale. For example the sulfide scale can include pyrite, pyrrhotite, troilite, greigite mackinawite, marcasite, or a combination thereof. In some embodiments, the sulfide scale is pyrite.

The sulfide scale can be associated with downstream equipment. The downstream equipment scale can be present in a subterranean formation. In some embodiments, the downstream equipment is a pipe, pipeline, or a vessel.

In some embodiments, the first oxidizer includes a persulfate. The persulfate can include ammonium persulfate, potassium persulfate, or a combination thereof. In some embodiments, the persulfate is ammonium persulfate.

The first oxidizer can have a concentration of about 5 mM to about 1 M. For example, the first oxidizer can have a concentration of about 25 mM to about 250 mM. In some embodiments, the first oxidizer is ammonium persulfate and has a concentration of about 5 mM to about 1 M. For example, the first oxidizer can be ammonium persulfate and have a concentration of about 25 mM to about 75 mM. In some embodiments, the first oxidizer is ammonium persulfate and has a concentration of about 60 mM to about 120 mM. In some embodiments, the first oxidizer is ammonium persulfate and has a concentration of about 125 mM to about 225 mM. In some embodiments, the first oxidizer is ammonium persulfate and has a concentration of about 250 mM to about 450 mM.

In some embodiments, the second oxidizer incudes a bromate. The bromate can include calcium bromate, magnesium bromate, potassium bromate, sodium bromate, or a combination thereof. In some embodiments, the bromate is sodium bromate.

The second oxidizer can have a concentration of about 5 mM to about 2 M. For example, the second oxidizer can have a concentration of about 30 mM to about 90 mM. The second oxidizer can also have a concentration of about 90 mM to about 170 mM. The second oxidizer can also have a concentration of about 160 mM to about 360 mM. The second oxidizer can also have a concentration of about 400 mM to about 700 mM.

In some embodiments, the second oxidizer is sodium bromate and has a concentration of about 5 mM to about 2 M. For example, the second oxidizer can be sodium bromate and have a concentration of about 30 mM to about 90 mM. In some embodiments, the second oxidizer is sodium bromate and has a concentration of about 90 mM to about 170 mM. In some embodiments, the second oxidizer is sodium bromate and has a concentration of about 160 mM to about 360 mM. In some embodiments, the second oxidizer is sodium bromate and has a concentration of about 400 mM to about 700 mM.

In some embodiments, the oxidizing composition includes a salt, such as an ammonium salt. In one example, the ammonium salt is ammonium acetate.

In some embodiments, the first oxidizer includes a persulfate and the second oxidizer includes a bromate. For example, the first oxidizer can include ammonium persulfate and the second oxidizer can include sodium bromate.

Treating the sulfide scale can occur at a temperature of greater than about 60° C. For example, treating the sulfide scale can occur at a temperature of greater than about 100° C. In some embodiments, treating the sulfide scale occurs at a temperature of about 60° C. to about 200° C. For example, treating the sulfide scale can occur at a temperature of about 100° C. to about 150° C.

Treating the sulfide scale can occur for a time of less than about 96 hours. For example, The sulfide scale can be treated for a time of less than about 24 hours. The sulfide scale can also be treated for a time of less than about 1 hour. In some embodiments, the sulfide scale is treated for a time of about 0.5 hours to about 96 hours. For example, the sulfide scale can be treated for a time of about 0.5 hours to about 6 hours. In some embodiments, the sulfide scale is treated for a time of about 1 hour.

Also provided in this disclosure is a method of treating an iron sulfide scale that includes contacting the sulfide scale with an oxidizing composition that includes a persulfate and a bromate. The persulfate oxidizer has a concentration of about 5 mM to about 1 M and the bromate oxidizer has a concentration of about 5 mM to about 2 M.

In some embodiments, treating the sulfide scale occurs at a temperature of about of 60° C. to about 200° C.

In some embodiments, the sulfide scale is treated for a time of less than about 96 hours.

Also provided in this disclosure is a method of treating an iron sulfide scale that includes contacting the sulfide scale with an oxidizing composition that includes ammonium persulfate and sodium bromate. The ammonium persulfate has a concentration of about 5 mM to about 1 M and the sodium bromate has a concentration of about 5 mM to about 2 M.

In some embodiments, treating the sulfide scale occurs at a temperature of about of 60° C. to about 200° C.

In some embodiments, the sulfide scale is treated for a time of less than about 96 hours.

Also provided in this disclosure is a method of treating a sulfide scale. The method includes contacting the sulfide scale with an oxidizing composition that includes an oxidizer.

The oxidizer can be a persulfate, a bromate, or a combination thereof. For example the oxidizer can be ammonium persulfate, sodium persulfate, potassium persulfate, calcium bromate, magnesium bromate, potassium bromate, sodium bromate, or a combination thereof.

The oxidizing composition can also include a salt. For example, the oxidizing composition can further include an ammonium salt, such as ammonium acetate.

DETAILED DESCRIPTION

Reference will now be made in detail to certain embodiments of the disclosed subject matter. While the disclosed subject matter will be described in conjunction with the enumerated claims, it will be understood that the exemplified subject matter is not intended to limit the claims to the disclosed subject matter.

Methods of Treating Sulfide Scale

Provided in this disclosure is a method of treating a sulfide scale. The method includes contacting the sulfide scale with an oxidizing composition that includes a first oxidizer and a second oxidizer.

The sulfide scale can be an iron sulfide scale. For example, the sulfide scale can be pyrite ($FeS_2$), pyrrhotite ($Fe_7S_8$), troilite (FeS), greigite ($Fe_9S_8$), mackinawite, marcasite, or a combination thereof. In some embodiments, the sulfide scale is pyrite. In some embodiments, the sulfide scale is a pyrrhotite.

The sulfide scale can be present in a subterranean formation. The sulfide scale can also be associated with downstream equipment. Downstream equipment can refer to pipes, pipelines, vessels, and to any equipment with which crude oil comes into contact. For example, such equipment may include, but is not limited to, separators, dehydrators, strainers, centrifuged, cyclones, and electrostatic precipitators. In some embodiments, the downstream equipment comprises at least one of a pipe, pipeline, or a vessel. The downstream equipment can be treated while in a subterranean formation, removed from the subterranean formation and then treated, or both.

The oxidizing composition can further include an aqueous liquid. For example, the oxidizing composition can include at least one of water, brine, produced water, flowback water, brackish water, fresh water, sea water, mineral water, and other waters of varying salinity and mineral concentration. In some embodiments, the aqueous liquid can include at least one of a drilling fluid, a fracturing fluid, a diverting fluid, and a lost circulation treatment fluid.

In some embodiments, the method further includes obtaining or providing the oxidizing composition. The obtaining or providing of the oxidizing composition can occur above-surface. The obtaining or providing of the composition can occur in the subterranean formation. For example, the first oxidizer can be placed in the subterranean formation and, at a later time, the second oxidizer can be placed in the subterranean formation to provide the oxidizing composition. Alternatively, the second oxidizer can be placed in the subterranean formation and, at a later time, the first oxidizer can be placed in the subterranean formation to provide the oxidizing composition.

The first oxidizer can be a persulfate. For example, the first oxidizer can include ammonium persulfate, potassium persulfate, or a combination thereof. In some embodiments, the first oxidizer is ammonium persulfate.

The first oxidizer can have a concentration of about of about 5 mM to about 1 M. For example, the first oxidizer can have a concentration of about 25 mM to about 75 mM, about 30 mM to about 55 mM, about 35 mM to about 50 mM. The first oxidizer can have a concentration of about 25 mM, 30 mM, 40 mM, 45 mM, 50 mM, 55 mM, or about 60 mM. In some embodiments the first oxidizer has a concentration of about 40 mM to about 45 mM. For example, the first oxidizer can be ammonium persulfate and have a concentration of about 0.25 g per 25 mL.

The first oxidizer can also have a concentration of about 60 mM to about 120 mM, about 70 mM to about 110 mM, or about 80 mM to about 100 mM. For example, the first oxidizer can have a concentration of about 60 mM, 70 mM, 80 mM, 90 mM, 100 mM, 110 mM or about 120 mM. In some embodiments the first oxidizer has a concentration of about 80 mM to about 90 mM. For example, the first oxidizer can be ammonium persulfate and have a concentration of about 0.50 g per 25 mL.

The first oxidizer can also have a concentration of about 125 mM to about 225 mM, about 150 mM to about 200 mM, or about 165 mM to about 185 mM. For example, the first oxidizer can have a concentration of about 125 mM, 150 mM, 175 mM, 200 mM, or about 225 mM. In some embodiments the first oxidizer has a concentration of about 170 mM to about 180 mM. For example, the first oxidizer can be ammonium persulfate and have a concentration of about 1.00 g per 25 mL.

The first oxidizer can also have a concentration of about 250 mM to about 450 mM, about 300 mM to about 400 mM, or about 325 mM to about 375 mM. For example, the first oxidizer can have a concentration of about 250 mM, 300 mM, 350 mM, 400 mM, or about 450 mM. In some embodiments the first oxidizer has a concentration of about 340 mM to about 360 mM. For example, the first oxidizer can be ammonium persulfate and have a concentration of about 2.00 g per 25 mL.

In some embodiments, the first oxidizer is ammonium persulfate and has a concentration of about of about 5 mM to about 1 M. For example, the ammonium persulfate can have a concentration of about 25 mM to about 75 mM, about 30 mM to about 55 mM, about 35 mM to about 50 mM. The ammonium persulfate can have a concentration of about 25 mM, 30 mM, 40 mM, 45 mM, 50 mM, 55 mM, or about 60 mM. In some embodiments the ammonium persulfate has a concentration of about 40 mM to about 45 mM.

The ammonium persulfate can also have a concentration of about 60 mM to about 120 mM, about 70 mM to about 110 mM, or about 80 mM to about 100 mM. For example, the ammonium persulfate can have a concentration of about 60 mM, 70 mM, 80 mM, 90 mM, 100 mM, 110 mM or about 120 mM. In some embodiments the ammonium persulfate has a concentration of about 80 mM to about 90 mM.

The ammonium persulfate can also have a concentration of about 125 mM to about 225 mM, about 150 mM to about 200 mM, or about 165 mM to about 185 mM. For example, the ammonium persulfate can have a concentration of about 125 mM, 150 mM, 175 mM, 200 mM, or about 225 mM. In some embodiments the ammonium persulfate has a concentration of about 170 mM to about 180 mM.

The ammonium persulfate can also have a concentration of about 250 mM to about 450 mM, about 300 mM to about 400 mM, or about 325 mM to about 375 mM. For example, the first ammonium persulfate can have a concentration of about 250 mM, 300 mM, 350 mM, 400 mM, or about 450 mM. In some embodiments the ammonium persulfate has a concentration of about 340 mM to about 360 mM.

In some embodiments, the second oxidizer is a bromate. The bromate can include a bromate selected from the group consisting of calcium bromate, magnesium bromate, potassium bromate, sodium bromate, or a combination thereof. In some embodiments, the bromate is sodium bromate.

The second oxidizer can have a concentration of about of about 5 mM to about 2 M. In some embodiments, the second oxidizer can have a concentration of about 30 mM to about 90 mM or about 40 mM to about 80 mM. For example, the second oxidizer can have a concentration of about 30 mM, 40 mM, 50 mM, 60 mM, 70 mM, 80 mM, or about 90 mM. In some embodiments the second oxidizer has a concentration of about 55 mM to about 75 mM. For example, the second oxidizer can be sodium bromate and have a concentration of about 0.25 g per 25 mL.

The second oxidizer can also have a concentration of about 90 mM to about 170 mM or about 110 mM to about 150 mM. For example, the second oxidizer can have a concentration of about 90 mM, 110 mM, 130 mM, 150 mM, or about 170 mM. In some embodiments the second oxidizer has a concentration of about 120 mM to about 140 mM. For example, the second oxidizer can be ammonium persulfate and have a concentration of about 0.5 g per 25 mL.

The second oxidizer can also have a concentration of about 160 mM to about 360 mM or about 200 to about 320 mM. For example, the second oxidizer can have a concentration of about 160 mM, 200 mM, 240 mM, 280 mM, 320 mM, or about 360 mM. In some embodiments the second oxidizer has a concentration of about 240 mM to about 280 mM. For example, the second oxidizer can be ammonium persulfate and have a concentration of about 1.0 g per 25 mL.

The second oxidizer can also have a concentration of about 400 mM to about 700 mM or about 450 to about 630 mM. For example, the second oxidizer can have a concentration of about 400 mM, 450 mM, 500 mM, 550 mM, 600 mM, 650 mM or about 700 mM. In some embodiments the second oxidizer has a concentration of about 500 mM to about 550 mM. For example, the second oxidizer can be ammonium persulfate and have a concentration of about 2.0 g per 25 mL.

In some embodiments, the second oxidizer is sodium bromate and has a concentration of about 30 mM to about 90 mM or about 40 mM to about 80 mM. For example, the sodium bromate can have a concentration of about 30 mM, 40 mM, 50 mM, 60 mM, 70 mM, 80 mM, or about 90 mM. In some embodiments the sodium bromate has a concentration of about 55 mM to about 75 mM.

The sodium bromate can also have a concentration of about 90 mM to about 170 mM or about 110 mM to about 150 mM. For example, the sodium bromate can have a concentration of about 90 mM, 110 mM, 130 mM, 150 mM, or about 170 mM. In some embodiments the sodium bromate has a concentration of about 120 mM to about 140 mM.

The sodium bromate can also have a concentration of about 160 mM to about 360 mM or about 200 to about 320 mM. For example, the sodium bromate can have a concentration of about 160 mM, 200 mM, 240 mM, 280 mM, 320 mM, or about 360 mM. In some embodiments the sodium bromate has a concentration of about 240 mM to about 280 mM.

The sodium bromate can also have a concentration of about 400 mM to about 700 mM or about 450 to about 630 mM. For example, the sodium bromate can have a concentration of about 400 mM, 450 mM, 500 mM, 550 mM, 600 mM, 650 mM or about 700 mM. In some embodiments the sodium bromate has a concentration of about 500 mM to about 550 mM.

The oxidizing composition can also include a salt. For example, the oxidizing composition can further include an ammonium salt. The ammonium salt can include ammonium acetate, ammonium bromide, ammonium carbonate, ammonium cerium(IV) sulfate dihydrate, ammonium chloride, ammonium fluoride, ammonium iodide, ammonium nitrate, ammonium sulfate, ammonium tetrafluoroborate, ammonium thiosulfate, or a combination thereof. In some embodiments, the ammonium salt is ammonium chloride. The salt can serve as a source of nitrite or nitrate. The salt can serve as a source of nitrite or nitrate following oxidation. For example, an ammonium salt can be oxidized to nitrite or nitrate and, thus, serve as a source of nitrite or nitrate.

In some embodiments, an oxidizing solution includes sodium bromate and ammonium acetate. The ammonium interacts synergistically with the bromate to enhance the dissolution of iron sulfide, and the acetate counteranion performs as a chelant to prevent or reduce the precipitation of iron sulfate (jarosite).

The salt can be present at a concentration of about 25 mM to about 1.0 M, about 50 mM to about 500 mM, about 75 mM to about 300 mM or about 100 mM to about 200 mM. For example, the ammonium salt can have a concentration of about 25 mM, 50 mM, 75 mM, 100 mM, 150 mM, 200 mM, 300 mM, 400 mM, 500 mM, 750 mM, or about 1.0 M. In some embodiments the ammonium salt has a concentration of about 125 mM to about 175 mM. For example, the ammonium salt be ammonium chloride and be present at a concentration of about 0.2 g per 25 mL.

The salt can be ammonium chloride and be present at a concentration of about 25 mM to about 1.0 M, about 50 mM to about 500 mM, about 75 mM to about 300 mM or about 100 mM to about 200 mM. For example, the ammonium salt can have a concentration of about 25 mM, 50 mM, 75 mM, 100 mM, 150 mM, 200 mM, 300 mM, 400 mM, 500 mM, 750 mM, or about 1.0 M.

In some embodiments, the first oxidizer includes a persulfate and the second oxidizer includes a bromate. The persulfate can have a concentration of about 5 mM to about 1 M and the bromate can have a concentration of about 5 mM to about 2 M. For example, the persulfate can have a concentration of about 25 mM to about 75 mM and the bromate can have a concentration of about 30 mM to about 90 mM; the persulfate can have a concentration of about 60 mM to about 120 mM and the bromate can have a concentration of about 90 mM to about 170 mM; the persulfate can have a concentration of about 125 mM to about 225 mM and the bromate can have a concentration of about 160 mM to about 360 mM; or the persulfate can have a concentration of about 250 mM to about 450 mM and bromate can have a concentration of about 400 mM to about 700 mM.

In some embodiments, the first oxidizer is ammonium persulfate and the second oxidizer is sodium bromate. The ammonium persulfate can have a concentration of about 5 mM to about 1 M and the sodium bromate can have a concentration of about 5 mM to about 2 M. For example, the ammonium persulfate can have a concentration of about 25 mM to about 75 mM and the sodium bromate can have a concentration of about 30 mM to about 90 mM; the ammonium persulfate can have a concentration of about 60 mM to about 120 mM and the sodium bromate can have a concentration of about 90 mM to about 170 mM; the ammonium persulfate can have a concentration of about 125 mM to about 225 mM and the sodium bromate can have a concentration of about 160 mM to about 360 mM; or the ammonium persulfate can have a concentration of about 250 mM to about 450 mM and sodium bromate can have a concentration of about 400 mM to about 700 mM. A synergy between the bromate and the ammonium cation, in which the ammonium cation is oxidized and changes the overall solution composition, making it more favorable for iron sulfide dissolution.

In some embodiments, the sulfide scale is treated at a temperature of greater than about 60° C. For example, treating the sulfide scale occurs at a temperature greater than about 100° C. In some embodiments, treating the sulfide scale occurs at a temperature of about 60° C. to about 200° C. For example, treating the sulfide scale can occur at a temperature of about 60° C., 80° C., 100° C., 120° C., 140° C., 160° C., 180° C., or about 200° C. In some embodiments, treating the sulfide scale occurs at a temperature of about 100° C. to about 150° C.

The sulfide scale can be treated for a time of less than about 96 hours, less than about 24 hours, or less than about 1 hour. For example, the sulfide scale can be treated for about 0.5 hours, 1 hours, 2 hours, 4 hours, 6 hours, 8 hours, 10 hours, 12 hours, 18 hours, 24 hours, 36 hours, 48 hours, 72 hours, or about 96 hours. In some embodiments, the sulfide scale is treated for a time of about 0.5 hours to about 96 hours. For example, the sulfide scale is treated for a time of about 0.5 to 72 hours, about 0.5 to about 48 hours, about 0.5 to about 36 hours, about 0.5 hours to about 24 hours, about 0.5 hours to about 18 hours, about 0.5 to about 12 hours, about 0.5 to 6 hours, or about 0.5 hours to about 1 hour.

Also provided herein is method of treating an iron sulfide scale that includes contacting the iron sulfide scale with an oxidizing composition. The oxidizing composition includes a persulfate and a bromate. The persulfate oxidizer has a concentration of about 5 mM to about 1 M and the bromate oxidizer has a concentration of about 5 mM to about 2 M. In some embodiments, the sulfide scale is treated at a temperature of about 60° C. to about 200° C. The sulfide scale can also be treated for a time of less than about 96 hours.

Also provided herein is a method of treating an iron sulfide scale that includes contacting the sulfide scale with an oxidizing composition that includes ammonium persulfate and sodium bromate. The ammonium persulfate has a concentration of about 5 mM to about 1 M and the sodium bromate has a concentration of about 5 mM to about 2 M.

The ammonium persulfate can have a concentration of about 25 mM to about 75 mM, about 60 mM to about 120 mM, about 125 mM to about 225 mM, or about 250 mM to about 450 mM. The sodium bromate can have a concentration of about 30 mM to about 90 mM, about 90 mM to about 170 mM, about 160 mM to about 360 mM, or about 400 mM to about 700 mM.

In some embodiments, the ammonium persulfate has a concentration of about 25 mM to about 75 mM and the sodium bromate has a concentration of about 30 mM to about 90 mM; the ammonium persulfate has a concentration of about 60 mM to about 120 mM and the sodium bromate has a concentration of about 90 mM to about 170 mM; the ammonium persulfate has a concentration of about 125 mM to about 225 mM and the sodium bromate has a concentration of about 160 mM to about 360 mM; or the ammonium persulfate has a concentration of about 250 mM to about 450 mM and sodium bromate has a concentration of about 400 mM to about 700 mM.

In some embodiments, the iron sulfide scale is treated at a temperature of about 60° C. to about 200° C. For example, the iron sulfide scale can be treated at a temperature of about 60° C., 80° C., 100° C., 120° C., 140° C., 160° C., 180° C., or about 200° C. In some embodiments, the iron sulfide scale is treated at a temperature of about 100° C. to about 150° C.

In some embodiments, the sulfide scale is treated for a time of about 0.5 hours to about 96 hours. For example, the sulfide scale is treated for a time of about 0.5 to 72 hours, about 0.5 to about 48 hours, about 0.5 to about 36 hours, about 0.5 hours to about 24 hours, about 0.5 hours to about 18 hours, about 0.5 to about 12 hours, about 0.5 to 6 hours, or about 0.5 hours to about 1 hour.

Also provided in this disclosure is a method of treating a sulfide scale. The method includes contacting the sulfide scale with an oxidizing composition that includes an oxidizer.

The oxidizer can be a persulfate, a bromate, or a combination thereof. For example the oxidizer can be ammonium persulfate, potassium persulfate, calcium bromate, magnesium bromate, potassium bromate, sodium bromate, or a combination thereof.

In some embodiments, the oxidizing composition includes just one oxidizer.

The oxidizing composition can further include an aqueous liquid. For example, the oxidizing composition can include at least one of water, brine, produced water, flowback water, brackish water, fresh water, sea water, mineral water, and other waters of varying salinity and mineral concentration. In some embodiments, the aqueous liquid can include at least one of a drilling fluid, a fracturing fluid, a diverting fluid, and a lost circulation treatment fluid.

In some embodiments, the oxidizer can have a concentration of about of about 5 mM to about 4 M. For example the oxidizer can have a concentration of about 5 mM, 50 mM, 100, mM, 250 mM, 500 mM, 1 M, 2, or about 4 M.

The oxidizing composition can also include a salt. For example, the oxidizing composition can further include an ammonium salt. The ammonium salt can include ammonium acetate, ammonium bromide, ammonium carbonate, ammonium cerium(IV) sulfate dihydrate, ammonium chloride, ammonium fluoride, ammonium iodide, ammonium nitrate, ammonium sulfate, ammonium tetrafluoroborate, ammonium thiosulfate, or a combination thereof. In some embodiments, the ammonium salt is ammonium chloride. The salt can serve as a source of nitrite or nitrate. The salt can serve as a source of nitrite or nitrate following oxidation. For example, an ammonium salt can be oxidized to nitrite or nitrate and, thus, serve as a source of nitrite or nitrate.

The salt can be present at a concentration of about 25 mM to about 1.0 M, about 50 mM to about 500 mM, about 75 mM to about 300 mM or about 100 mM to about 200 mM. For example, the ammonium salt can have a concentration of about 25 mM, 50 mM, 75 mM, 100 mM, 150 mM, 200 mM, 300 mM, 400 mM, 500 mM, 750 mM, or about 1.0 M. In some embodiments the ammonium salt has a concentration of about 125 mM to about 175 mM. For example, the ammonium salt be ammonium chloride and be present at a concentration of about 0.2 g per 25 mL.

The salt can be ammonium chloride and be present at a concentration of about 25 mM to about 1.0 M, about 50 mM to about 500 mM, about 75 mM to about 300 mM or about 100 mM to about 200 mM. For example, the ammonium salt can have a concentration of about 25 mM, 50 mM, 75 mM, 100 mM, 150 mM, 200 mM, 300 mM, 400 mM, 500 mM, 750 mM, or about 1.0 M.

In some embodiments, the sulfide scale is treated at a temperature of greater than about 60° C. For example, treating the sulfide scale occurs at a temperature greater than about 100° C. In some embodiments, treating the sulfide scale occurs at a temperature of about 60° C. to about 200° C. For example, treating the sulfide scale can occur at a temperature of about 60° C., 80° C., 100° C., 120° C., 140° C., 160° C., 180° C., or about 200° C. In some embodiments, treating the sulfide scale occurs at a temperature of about 100° C. to about 150° C.

The sulfide scale can be treated for a time of less than about 96 hours, less than about 24 hours, or less than about 1 hour. For example, the sulfide scale can be treated for about 0.5 hours, 1 hours, 2 hours, 4 hours, 6 hours, 8 hours, 10 hours, 12 hours, 18 hours, 24 hours, 36 hours, 48 hours, 72 hours, or about 96 hours. In some embodiments, the sulfide scale is treated for a time of about 0.5 hours to about 96 hours. For example, the sulfide scale is treated for a time of about 0.5 to 72 hours, about 0.5 to about 48 hours, about 0.5 to about 36 hours, about 0.5 hours to about 24 hours, about 0.5 hours to about 18 hours, about 0.5 to about 12 hours, about 0.5 hours to about 6 hours, or about 0.5 hours to about 1 hour.

Oxidizing Compositions

Also provided is an oxidizing composition that includes ammonium persulfate and sodium bromate. The ammonium persulfate has a concentration of about 5 mM to about 1 M and the sodium bromate has a concentration of about 5 mM to about 2 M.

In some embodiments, the ammonium persulfate can have a concentration of about 25 mM to about 75 mM, about 60 mM to about 120 mM, about 125 mM to about 225 mM, or about 250 mM to about 450 mM. In some embodiments, the sodium bromate can have a concentration of about 30 mM to about 90 mM, about 90 mM to about 170 mM, about 160 mM to about 360 mM, or about 400 mM to about 700 mM.

In some embodiments, the ammonium persulfate has a concentration of about 25 mM to about 75 mM and the sodium bromate has a concentration of about 30 mM to about 90 mM; the ammonium persulfate has a concentration of about 60 mM to about 120 mM and the sodium bromate has a concentration of about 90 mM to about 170 mM; the ammonium persulfate has a concentration of about 125 mM to about 225 mM and the sodium bromate has a concentration of about 160 mM to about 360 mM; or the ammonium persulfate has a concentration of about 250 mM to about 450 mM and sodium bromate has a concentration of about 400 mM to about 700 mM.

In some embodiments, the oxidizing composition further includes an aqueous liquid. For example, the oxidizing composition can include at least one of water, brine, produced water, flowback water, brackish water, fresh water, sea water, mineral water, and other waters of varying salinity and mineral concentration. The aqueous liquid can include at least one of a drilling fluid, a fracturing fluid, a diverting fluid, and a lost circulation treatment fluid.

System or Apparatus

Also provided in this disclosure is a system including (i) an oxidizing composition including a first oxidizer and a second oxidizer, as described in this disclosure; and (ii) a subterranean formation including the oxidizing composition therein.

In some embodiments, the oxidizing composition in the system can also include a downhole fluid, or the system can include a mixture of the oxidizing composition and downhole fluid. In some embodiments, the system can include a tubular, and a pump configured to pump the oxidizing composition into the subterranean formation through the tubular.

In some embodiments, the system can include a pump fluidly coupled to a tubular (for example, any suitable type of oilfield pipe, such as pipeline, drill pipe, production tubing, and the like), the tubular containing a composition including the coated nanoparticle and the ion, described in this disclosure.

In some embodiments, the system can include a drillstring disposed in a wellbore, the drillstring including a drill bit at a downhole end of the drillstring. The system can include an annulus between the drillstring and the wellbore. The system can also include a pump configured to circulate the composition through the drill string, through the drill bit, and back above-surface through the annulus. The system can include a fluid processing unit configured to process the composition exiting the annulus to generate a cleaned drilling fluid for recirculation through the wellbore.

Other Components

The oxidizing composition including the first oxidizer and the second oxidizer can further include one or more suitable components. The additional components can be any component—such that the oxidizing composition can be used as described in this disclosure.

In some embodiments, the composition includes one or more viscosifiers. The viscosifier can be any suitable viscosifier. The viscosifier can affect the viscosity of the composition or a solvent that contacts the composition at any suitable time and location. In some embodiments, the viscosifier provides an increased viscosity at least one of before injection into the subterranean formation, at the time of injection into the subterranean formation, during travel through a tubular disposed in a borehole, once the composition reaches a particular subterranean location, or some period of time after the composition reaches a particular subterranean location. In some embodiments, the viscosifier can be about 0.0001 wt % to about 10 wt % of the composition.

The viscosifier can include at least one of a linear polysaccharide, and poly($(C_2$-$C_{10}$)alkenylene), in which at each occurrence, the $(C_2$-$C_{10}$)alkenylene is independently substituted or unsubstituted. In some embodiments, the viscosifier can include at least one of poly(acrylic acid) or $(C_1$-$C_5$)alkyl esters thereof, poly(methacrylic acid) or $(C_1$-$C_5$)alkyl esters thereof, poly(vinyl acetate), poly(vinyl alcohol), poly(ethylene glycol), poly(vinyl pyrrolidone), polyacrylamide, poly(hydroxyethyl methacrylate), alginate, chitosan, curdlan, dextran, emulsan, gellan, glucuronan, N-acetyl-glucosamine, N-acetyl-heparosan, hyaluronic acid, kefiran, lentinan, levan, mauran, pullulan, scleroglucan, schizophyllan, stewartan, succinoglycan, xanthan, welan, derivatized starch, tamarind, tragacanth, guar gum, derivatized guar (for example, hydroxypropyl guar, carboxy methyl guar, or carboxymethyl hydroxylpropyl guar), gum ghatti, gum arabic, locust bean gum, and derivatized cellulose (for example, carboxymethyl cellulose, hydroxyethyl cellulose, carboxymethyl hydroxyethyl cellulose, hydroxypropyl cellulose, or methyl hydroxyl ethyl cellulose).

The viscosifier can include a poly(vinyl alcohol) homopolymer, poly(vinyl alcohol) copolymer, a crosslinked poly(vinyl alcohol) homopolymer, and a crosslinked poly(vinyl alcohol) copolymer. The viscosifier can include a poly(vinyl alcohol) copolymer or a crosslinked poly(vinyl alcohol) copolymer including at least one of a graft, linear, branched, block, and random copolymer of vinyl alcohol and at least one of a substituted or unsubstituted $(C_2-C_{50})$hydrocarbyl having at least one aliphatic unsaturated C—C bond therein, and a substituted or unsubstituted $(C_2-C_{50})$alkene. The viscosifier can include a poly(vinyl alcohol) copolymer or a crosslinked poly(vinyl alcohol) copolymer including at least one of a graft, linear, branched, block, and random copolymer of vinyl alcohol and at least one of vinyl phosphonic acid, vinylidene diphosphonic acid, substituted or unsubstituted 2-acrylamido-2-methylpropanesulfonic acid, a substituted or unsubstituted $(C_1-C_{20})$alkenoic acid, propenoic acid, butenoic acid, pentenoic acid, hexenoic acid, octenoic acid, nonenoic acid, decenoic acid, acrylic acid, methacrylic acid, hydroxypropyl acrylic acid, acrylamide, fumaric acid, methacrylic acid, hydroxypropyl acrylic acid, vinyl phosphonic acid, vinylidene diphosphonic acid, itaconic acid, crotonic acid, mesoconic acid, citraconic acid, styrene sulfonic acid, allyl sulfonic acid, methallyl sulfonic acid, vinyl sulfonic acid, and a substituted or unsubstituted $(C_1-C_{20})$ alkyl ester thereof. The viscosifier can include a poly(vinyl alcohol) copolymer or a crosslinked poly(vinyl alcohol) copolymer including at least one of a graft, linear, branched, block, and random copolymer of vinyl alcohol and at least one of vinyl acetate, vinyl propanoate, vinyl butanoate, vinyl pentanoate, vinyl hexanoate, vinyl 2-methyl butanoate, vinyl 3-ethylpentanoate, and vinyl 3-ethylhexanoate, maleic anhydride, a substituted or unsubstituted $(C_1-C_{20})$alkenoic substituted or unsubstituted $(C_1-C_{20})$alkanoic anhydride, a substituted or unsubstituted $(C_1-C_{20})$alkenoic substituted or unsubstituted $(C_1-C_{20})$alkenoic anhydride, propenoic acid anhydride, butenoic acid anhydride, pentenoic acid anhydride, hexenoic acid anhydride, octenoic acid anhydride, nonenoic acid anhydride, decenoic acid anhydride, acrylic acid anhydride, fumaric acid anhydride, methacrylic acid anhydride, hydroxypropyl acrylic acid anhydride, vinyl phosphonic acid anhydride, vinylidene diphosphonic acid anhydride, itaconic acid anhydride, crotonic acid anhydride, mesoconic acid anhydride, citraconic acid anhydride, styrene sulfonic acid anhydride, allyl sulfonic acid anhydride, methallyl sulfonic acid anhydride, vinyl sulfonic acid anhydride, and an N—$(C1-C_{10})$alkenyl nitrogen containing substituted or unsubstituted $(C_1-C_{10})$heterocycle. The viscosifier can include a poly(vinyl alcohol) copolymer or a crosslinked poly(vinyl alcohol) copolymer including at least one of a graft, linear, branched, block, and random copolymer that includes a poly(vinylalcohol)-poly(acrylamide) copolymer, a poly(vinylalcohol)-poly(2-acrylamido-2-methylpropanesulfonic acid) copolymer, or a poly(vinylalcohol)-poly(N-vinylpyrrolidone) copolymer. The viscosifier can include a crosslinked poly(vinyl alcohol) homopolymer or copolymer including a crosslinker including at least one of an aldehyde, an aldehyde-forming compound, a carboxylic acid or an ester thereof, a sulfonic acid or an ester thereof, a phosphonic acid or an ester thereof, an acid anhydride, and an epihalohydrin.

In some embodiments, the composition, or a mixture including the same, can include any suitable amount of any suitable material used in a downhole fluid. For example, the composition or a mixture including the same can include water, saline, aqueous base, acid, oil, organic solvent, synthetic fluid oil phase, aqueous solution, alcohol or polyol, cellulose, starch, alkalinity control agents, acidity control agents, density control agents, density modifiers, emulsifiers, dispersants, polymeric stabilizers, crosslinking agents, polyacrylamide, a polymer or combination of polymers, antioxidants, heat stabilizers, foam control agents, solvents, diluents, plasticizer, filler or inorganic particle, pigment, dye, precipitating agent, rheology modifier, oil-wetting agents, set retarding additives, surfactants, gases, weight reducing additives, heavy-weight additives, lost circulation materials, filtration control additives, fibers, thixotropic additives, breakers, crosslinkers, rheology modifiers, curing accelerators, curing retarders, pH modifiers, chelating agents, scale inhibitors, enzymes, resins, water control materials, oxidizers, markers, Portland cement, pozzolana cement, gypsum cement, high alumina content cement, slag cement, silica cement, fly ash, metakaolin, shale, zeolite, a crystalline silica compound, amorphous silica, hydratable clays, microspheres, lime, or a combination thereof.

A drilling fluid, also known as a drilling mud or simply "mud," is a specially designed fluid that is circulated through a wellbore as the wellbore is being drilled to facilitate the drilling operation. The drilling fluid can be water-based or oil-based. The drilling fluid can carry cuttings up from beneath and around the bit, transport them up the annulus, and allow their separation. Also, a drilling fluid can cool and lubricate the drill head as well as reduce friction between the drill string and the sides of the hole. The drilling fluid aids in support of the drill pipe and drill head, and provides a hydrostatic head to maintain the integrity of the wellbore walls and prevent well blowouts. Specific drilling fluid systems can be selected to optimize a drilling operation in accordance with the characteristics of a particular geological formation. The drilling fluid can be formulated to prevent unwanted influxes of formation fluids from permeable rocks and also to form a thin, low permeability filter cake that temporarily seals pores, other openings, and formations penetrated by the bit. In water-based drilling fluids, solid particles are suspended in a water or brine solution containing other components. Oils or other non-aqueous liquids can be emulsified in the water or brine or at least partially solubilized (for less hydrophobic non-aqueous liquids), but water is the continuous phase. A drilling fluid can be present in the mixture with the composition including the crosslinkable ampholyte polymer and the crosslinker, or a crosslinked reaction product thereof, in any suitable amount, such as about 1 wt % or less, about 2 wt %, 3, 4, 5, 10, 15, 20, 30, 40, 50, 60, 70, 80, 85, 90, 95, 96, 97, 98, 99, 99.9, 99.99, 99.999, or about 99.999.9 wt % or more of the mixture.

A water-based drilling fluid in methods provided in this disclosure can be any suitable water-based drilling fluid. In some embodiments, the drilling fluid can include at least one of water (fresh or brine), a salt (for example, calcium chloride, sodium chloride, potassium chloride, magnesium chloride, calcium bromide, sodium bromide, potassium bromide, calcium nitrate, sodium formate, potassium formate, cesium formate), aqueous base (for example, sodium hydroxide or potassium hydroxide), alcohol or polyol, cellulose, starches, alkalinity control agents, density control agents such as a density modifier (for example, barium sulfate), surfactants (for example, betaines, alkali metal alkylene acetates, sultaines, ether carboxylates), emulsifiers, dispersants, polymeric stabilizers, crosslinking agents, polyacrylamides, polymers or combinations of polymers, antioxidants, heat stabilizers, foam control agents, foaming agents, solvents, diluents, plasticizers, filler or inorganic particles (for example, silica), pigments, dyes, precipitating agents (for example, silicates or aluminum complexes), and rheology modifiers such as thickeners or viscosifiers (for example, xanthan gum). Any ingredient listed in this paragraph can be either present or not present in the mixture.

An oil-based drilling fluid or mud in methods provided in this disclosure can be any suitable oil-based drilling fluid. In some embodiments the drilling fluid can include at least one of an oil-based fluid (or synthetic fluid), saline, aqueous solution, emulsifiers, other agents of additives for suspension control, weight or density control, oil-wetting agents, fluid loss or filtration control agents, and rheology control agents. For example, see H. C. H. Darley and George R. Gray, *Composition and Properties of Drilling and Completion Fluids* 66-67, 561-562 (5th ed. 1988). An oil-based or invert emulsion-based drilling fluid can include between about 10:90 to about 95:5, or about 50:50 to about 95:5, by volume of oil phase to water phase. A substantially all oil mud includes about 100% liquid phase oil by volume (for example, substantially no internal aqueous phase).

A pill is a relatively small quantity (for example, less than about 500 bbl, or less than about 200 bbl) of drilling fluid used to accomplish a specific task that the regular drilling fluid cannot perform. For example, a pill can be a high-viscosity pill to, for example, help lift cuttings out of a vertical wellbore. In another example, a pill can be a freshwater pill to, for example, dissolve a salt formation. Another example is a pipe-freeing pill to, for example, destroy filter cake and relieve differential sticking forces. In another example, a pill is a lost circulation material pill to, for example, plug a thief zone. A pill can include any component described in this disclosure as a component of a drilling fluid.

The composition or mixture can further include a proppant, a resin-coated proppant, an encapsulated resin, or a combination thereof. A proppant is a material that keeps an induced hydraulic fracture at least partially open during or after a fracturing treatment. Proppants can be transported into the subterranean formation and to the fracture using fluid, such as fracturing fluid or another fluid. A higher-viscosity fluid can more effectively transport proppants to a desired location in a fracture, especially larger proppants, by more effectively keeping proppants in a suspended state within the fluid. Examples of proppants can include sand, gravel, glass beads, polymer beads, ground products from shells and seeds such as walnut hulls, and manmade materials such as ceramic proppant, bauxite, tetrafluoroethylene materials (for example, TEFLON™ available from DuPont), fruit pit materials, processed wood, composite particulates prepared from a binder and fine grade particulates such as silica, alumina, fumed silica, carbon black, graphite, mica, titanium dioxide, meta-silicate, calcium silicate, kaolin, talc, zirconia, boron, fly ash, hollow glass microspheres, and solid glass, or mixtures thereof. In some embodiments, proppant can have an average particle size, in which particle size is the largest dimension of a particle, of about 0.001 mm to about 3 mm, about 0.15 mm to about 2.5 mm, about 0.25 mm to about 0.43 mm, about 0.43 mm to about 0.85 mm, about 0.85 mm to about 1.18 mm, about 1.18 mm to about 1.70 mm, or about 1.70 to about 2.36 mm. In some embodiments, the proppant can have a distribution of particle sizes clustering around multiple averages, such as one, two, three, or four different average particle sizes. The composition or mixture can include any suitable amount of proppant, such as about 0.0001 wt % to about 99.9 wt %, about 0.1 wt % to about 80 wt %, or about 10 wt % to about 60 wt %, or about 0.00000001 wt % or less, or about 0.000001 wt %, 0.0001, 0.001, 0.01, 0.1, 1, 2, 3, 4, 5, 10, 15, 20, 30, 40, 50, 60, 70, 80, 85, 90, 91, 92, 93, 94, 95, 96, 97, 98, 99, 99.9 wt %, or about 99.99 wt % or more.

Additional Information

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section. A comma can be used as a delimiter or digit group separator to the left or right of a decimal mark; for example, "0.000.1" is equivalent to "0.0001." All publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

In the methods of manufacturing described herein, the acts can be carried out in any order, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

The term "about" as used herein can allow for a degree of variability in a value or range, for example, within 10%, within 5%, or within 1% of a stated value or of a stated limit of a range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more.

The term "solvent" as used herein refers to a liquid that can dissolve a solid, another liquid, or a gas. Non-limiting examples of solvents are silicones, organic compounds, water, alcohols, ionic liquids, and supercritical fluids.

The term "room temperature" as used herein refers to a temperature of about 15° C. to about 28° C.

The term "standard temperature and pressure" as used herein refers to 20° C. and 101 kPa.

The term "downhole" as used herein refers to under the surface of the earth, such as a location within or fluidly connected to a wellbore.

As used herein, the term "drilling fluid" refers to fluids, slurries, or muds used in drilling operations downhole, such as during the formation of the wellbore.

As used herein, the term "stimulation fluid" refers to fluids or slurries used downhole during stimulation activities of the well that can increase the production of a well, including perforation activities. In some examples, a stimulation fluid can include a fracturing fluid or an acidizing fluid.

As used herein, the term "clean-up fluid" refers to fluids or slurries used downhole during clean-up activities of the well, such as any treatment to remove material obstructing the flow of desired material from the subterranean formation. In one example, a clean-up fluid can be an acidification treatment to remove material formed by one or more perforation treatments. In another example, a clean-up fluid can be used to remove a filter cake.

As used herein, the term "fracturing fluid" refers to fluids or slurries used downhole during fracturing operations.

As used herein, the term "spotting fluid" refers to fluids or slurries used downhole during spotting operations, and can be any fluid designed for localized treatment of a downhole region. In one example, a spotting fluid can include a lost circulation material for treatment of a specific section of the wellbore, such as to seal off fractures in the wellbore and prevent sag. In another example, a spotting fluid can include a water control material. In some examples, a spotting fluid can be designed to free a stuck piece of drilling or extraction equipment, can reduce torque and drag with drilling lubricants, prevent differential sticking, promote wellbore stability, and can help to control mud weight.

As used herein, the term "completion fluid" refers to fluids or slurries used downhole during the completion phase of a well, including cementing compositions.

As used herein, the term "remedial treatment fluid" refers to fluids or slurries used downhole for remedial treatment of a well. Remedial treatments can include treatments designed to increase or maintain the production rate of a well, such as stimulation or clean-up treatments.

As used herein, the term "abandonment fluid" refers to fluids or slurries used downhole during or preceding the abandonment phase of a well.

As used herein, the term "acidizing fluid" refers to fluids or slurries used downhole during acidizing treatments. In one example, an acidizing fluid is used in a clean-up operation to remove material obstructing the flow of desired material, such as material formed during a perforation operation. In some examples, an acidizing fluid can be used for damage removal.

As used herein, the term "cementing fluid" refers to fluids or slurries used during cementing operations of a well. For example, a cementing fluid can include an aqueous mixture including at least one of cement and cement kiln dust. In another example, a cementing fluid can include a curable resinous material such as a polymer that is in an at least partially uncured state.

As used herein, the term "water control material" refers to a solid or liquid material that interacts with aqueous material downhole, such that hydrophobic material can more easily travel to the surface and such that hydrophilic material (including water) can less easily travel to the surface. A water control material can be used to treat a well to cause the proportion of water produced to decrease and to cause the proportion of hydrocarbons produced to increase, such as by selectively binding together material between water-producing subterranean formations and the wellbore while still allowing hydrocarbon-producing formations to maintain output.

As used herein, the term "packer fluid" refers to fluids or slurries that can be placed in the annular region of a well between tubing and outer casing above a packer. In various examples, the packer fluid can provide hydrostatic pressure in order to lower differential pressure across the sealing element, lower differential pressure on the wellbore and casing to prevent collapse, and protect metals and elastomers from corrosion.

As used herein, the term "fluid" refers to liquids and gels, unless otherwise indicated.

As used herein, the term "subterranean material" or "subterranean formation" refers to any material under the surface of the earth, including under the surface of the bottom of the ocean. For example, a subterranean formation or material can be any section of a wellbore and any section of a subterranean petroleum- or water-producing formation or region in fluid contact with the wellbore. Placing a material in a subterranean formation can include contacting the material with any section of a wellbore or with any subterranean region in fluid contact therewith. Subterranean materials can include any materials placed into the wellbore such as cement, drill shafts, liners, tubing, casing, or screens; placing a material in a subterranean formation can include contacting with such subterranean materials. In some examples, a subterranean formation or material can be any below-ground region that can produce liquid or gaseous petroleum materials, water, or any section below-ground in fluid contact therewith. For example, a subterranean formation or material can be at least one of an area desired to be fractured, a fracture or an area surrounding a fracture, and a flow pathway or an area surrounding a flow pathway, wherein a fracture or a flow pathway can be optionally fluidly connected to a subterranean petroleum- or water-producing region, directly or through one or more fractures or flow pathways.

As used herein, "treatment of a subterranean formation" can include any activity directed to extraction of water or petroleum materials from a subterranean petroleum- or water-producing formation or region, for example, including drilling, stimulation, hydraulic fracturing, clean-up, acidizing, completion, cementing, remedial treatment, abandonment, and the like.

As used herein, a "flow pathway" downhole can include any suitable subterranean flow pathway through which two subterranean locations are in fluid connection. The flow pathway can be sufficient for petroleum or water to flow from one subterranean location to the wellbore or vice-versa. A flow pathway can include at least one of a hydraulic fracture, and a fluid connection across a screen, across gravel pack, across proppant, including across resin-bonded proppant or proppant deposited in a fracture, and across sand. A flow pathway can include a natural subterranean passageway through which fluids can flow. In some embodiments, a flow pathway can be a water source and can include water. In some embodiments, a flow pathway can be a petroleum source and can include petroleum. In some embodiments, a flow pathway can be sufficient to divert from a wellbore, fracture, or flow pathway connected thereto at least one of water, a downhole fluid, or a produced hydrocarbon.

As used herein, a "carrier fluid" refers to any suitable fluid for suspending, dissolving, mixing, or emulsifying with one or more materials to form a composition. For example, the carrier fluid can be at least one of crude oil, dipropylene glycol methyl ether, dipropylene glycol dimethyl ether, dipropylene glycol methyl ether, dipropylene glycol dimethyl ether, dimethyl formamide, diethylene glycol methyl ether, ethylene glycol butyl ether, diethylene glycol butyl ether, butylglycidyl ether, propylene carbonate, D-limonene, a C2-C40 fatty acid C1-C10 alkyl ester (e.g., a fatty acid methyl ester), tetrahydrofurfuryl methacrylate, tetrahydrofurfuryl acrylate, 2-butoxy ethanol, butyl acetate, butyl lactate, furfuryl acetate, dimethyl sulfoxide, dimethyl formamide, a petroleum distillation product of fraction (e.g., diesel, kerosene, napthas, and the like) mineral oil, a hydrocarbon oil, a hydrocarbon including an aromatic carbon-carbon bond (e.g., benzene, toluene), a hydrocarbon including an alpha olefin, xylenes, an ionic liquid, methyl ethyl ketone, an ester of oxalic, maleic or succinic acid, methanol, ethanol, propanol (iso- or normal-), butyl alcohol (iso-, tert-, or normal-), an aliphatic hydrocarbon (e.g., cyclohexanone, hexane), water, brine, produced water, flowback water, brackish water, and sea water. The fluid can form about 0.001 wt % to about 99.999 wt % of a composition, or a mixture including the same, or about 0.001 wt % or less, 0.01 wt %, 0.1, 1, 2, 3, 4, 5, 6, 8, 10, 15, 20, 25, 30, 35, 40, 45, 50, 55, 60, 65, 70, 75, 80, 85, 90, 95, 96, 97, 98, 99, 99.9, 99.99, or about 99.999 wt % or more

EXAMPLES

Example 1

Experiments were performed to assess the dissolution capacity of ammonium persulfate in water towards the most insoluble iron sulfide, pyrite. Aqueous solutions of ammonium persulfate (APS) and 25-50 mL of water were prepared in a glass tube. 0.10 g of pyrite was added to the mixture. The tube was sealed and placed in an oil heating bath at 80-100° C. After heating for a designated period of time, the reaction vessel was cooled to room temperature. The liquid was isolated and was analyzed via inductively coupled plasma (ICP) to determine the concentration of iron in solution. Table 1 shows the results of the experiments performed, where the first and last were performed in duplicate. At 80° C., around 25% of the iron sulfide was dissolved with 1.0 g of ammonium persulfate (molar ratio of approximately 5:1 persulfate:iron). By increasing the amount of ammonium persulfate to 10-50 times excess relative to iron, approximately 75% of the pyrite was dissolved. Similarly, by increasing the temperature to 100° C., approximately 75% of the pyrite was dissolved with a ratio of approximately 5:1 persulfate:iron.

TABLE 1

Dissolution of pyrite by ammonium persulfate

| Water (mL) | APS (g) | SB (g) | Pyrite (g) | Temp (° C.) | Time (hr) | [Fe] (% Dissolved) |
|---|---|---|---|---|---|---|
| 50 | 1.00 | 0.00 | 0.10 | 80 | 96 | 26, 28 |
| 50 | 2.00 | 0.00 | 0.10 | 80 | 96 | 74 |
| 50 | 5.00 | 0.00 | 0.10 | 80 | 96 | 80 |
| 25 | 1.00 | 0.00 | 0.10 | 100 | 96 | 77, 71 |

Example 2

Experiments were conducted to assess the performance of sodium bromate in the dissolution of iron sulfide. Aqueous solutions of 1.0 g sodium bromate and 25 mL of water were prepared in a glass tube. 0.10 g of pyrite was added to the mixture. The tube was sealed and placed in an oil heating bath at 150° C. After heating for 24 hours, the reaction vessel was cooled to room temperature. The liquid was isolated and was analyzed via ICP to determine the concentration of iron in solution. On average, 6% of iron sulfide was dissolved in the 24 hour period, with some yellow precipitate also observed.

Example 3

Ammonium persulfate (APS) and sodium bromate (SB) together in aqueous solution were demonstrated to dissolve pyrite faster and to a greater extent than either oxidizer alone. Aqueous solutions of two oxidizers, sodium bromate and ammonium persulfate, of variable concentrations and 25 mL of water were prepared in a glass tube. 0.10 g of pyrite was added to the mixture. The tube was sealed and placed in an oil heating bath at 100° C. for one hour. The reaction vessels were cooled to room temperature and analyzed via ICP to determine the concentration of iron. Table 2 shows the results of the experiments, which were run in triplicate. Further, similar tests were performed with fixed concentrations of oxidizers (0.5 g of each) and variable amounts of time (2-16 hours). The majority of iron sulfide dissolution occurred within a few hours. Further, the results demonstrate a synergistic relationship exists between ammonium persulfate and sodium bromate.

TABLE 2

Reaction conditions and % Fe dissolved for persulfate, bromate, and pyrite

| Water (mL) | APS (g) | SB (g) | Pyrite (g) | Temp (° C.) | Time (hr) | [Fe] (% Dissolved) |
|---|---|---|---|---|---|---|
| 25 | 2.00 | 2.00 | 0.10 | 100 | 1 | 100, 86, 100 |
| 25 | 1.00 | 1.00 | 0.10 | 100 | 1 | 100, 79, 100 |
| 25 | 0.50 | 0.50 | 0.10 | 100 | 1 | 100, 61, 94 |
| 25 | 0.25 | 0.25 | 0.10 | 100 | 1 | 51, 50, 40 |
| 25 | 0.50 | 0.50 | 0.10 | 100 | 2 | 73 |
| 25 | 0.50 | 0.50 | 0.10 | 100 | 4 | 89 |
| 25 | 0.50 | 0.50 | 0.10 | 100 | 8 | 89 |
| 25 | 0.50 | 0.50 | 0.10 | 100 | 16 | 100 |

Example 4

Aqueous oxidizing solutions of variable concentrations and 25 mL of water were prepared in a glass tube ("APS" is ammonium persulfate; "KPS" is potassium persulfate; "SB" is sodium bromate; and "AC" is ammonium chloride). 0.10 g of pyrite was added to the mixture. The tube was sealed and placed in an oil heating bath at 100-150° C. for one hour. The reaction vessels were cooled to room temperature and analyzed via ICP to determine the concentration of iron. Table 3 shows the results of the experiments. All oxidizer systems exhibited the ability to dissolve iron sulfide.

TABLE 3

Dissolution of pyrite by various solutions

| Water (mL) | Oxidizer | Oxidizer (g) | Pyrite (g) | Temp (° C.) | Time (hr) | [Fe] (% Dissolved) |
|---|---|---|---|---|---|---|
| 25 | KPS, SB | 0.5, 0.5 | 0.10 | 150 | 1 | 14 |
| 25 | KPS, SB, AC | 0.5, 0.5, 0.2 | 0.10 | 150 | 1 | 25 |
| 25 | SB, AC | 0.5, 0.2 | 0.10 | 150 | 1 | 13 |
| 25 | KPS, SB | 0.5, 0.5 | 0.10 | 100 | 1 | 33 |
| 25 | KPS, SB, AC | 0.5, 0.5, 0.2 | 0.10 | 100 | 1 | 40 |
| 25 | SB, AC | 0.5, 0.2 | 0.10 | 100 | 1 | 11 |
| 25 | $Na_2S_2O_8$ | 1.00 | 0.10 | 100 | 1 | 13 |
| 25 | urea $H_2O_2$ | 1.00 | 0.10 | 100 | 1 | 1 |

Example 5

The effect of temperature on the ammonium persulfate and sodium bromate system was assessed. Previous experiments demonstrated the efficacy of the system at 100° C., and the Table 4 shows that similar results are obtained also at 120° C. and 150° C. The results are averages of at least 3 experiments.

TABLE 4

Dissolution of pyrite by solutions of ammonium persulfate and sodium bromate

| Water (mL) | Oxidizer | Oxidizer (g) | Pyrite (g) | Temp (° C.) | Time (hr) | [Fe] (% Dissolved) |
|---|---|---|---|---|---|---|
| 25 | APS, SB | 0.5, 0.5 | 0.10 | 100 | 1 | 79 |
| 25 | APS, SB | 0.5, 0.5 | 0.10 | 120 | 1 | 60 |
| 25 | APS, SB | 0.5, 0.5 | 0.10 | 150 | 1 | 78 |

Example 6

The effect of temperature on dissolution of pyrite with solutions of sodium persulfate and sodium bromate was assessed. Results are shown in Table 5.

TABLE 5

Dissolution of pyrite by solutions of sodium persulfate and sodium bromate

| Sample | Temperature (° C.) | Time (hrs) | Water (mL) | $NaBrO_3$ (mg) | $Na_2S_2O_9$ (mg) | Initial Pyrite (mg) | Final Mass (mg) | Mass Lost (mg) | [Fe] (mg/L) | [$SO_4$] (mg/L) | pH |
|---|---|---|---|---|---|---|---|---|---|---|---|
| PB1 | 100 | 6 | 25 | 400 | 631 | ~100 | 48.6 | 51.4 | 961.3 | 160.64 | 1.20 |
| PB2 | 100 | 6 | 25 | 400 | 631 | ~100 | 35.3 | 64.7 | 1294 | 29580 | 1.27 |
| PB3 | 20 | 144 | 25 | 400 | 631 | 99.9 | 24.4 | 75.5 | 937.4 | 38270 | 2.00 |
| PB4 | 20 | 144 | 25 | 400 | 631 | ~100 | 22.7 | 77.3 | 1016 | 34830 | 2.01 |
| PB5 | 20 | 144 | 25 | 400 | 631 | 102.6 | 19 | 83.6 | 1070 | 35750 | 2.13 |
| PB6 | 50 | 20 | 25 | 400 | 631 | ~100 | 20.8 | 79.2 | 1096 | 33430 | 1.76 |
| PB7 | 50 | 20 | 25 | 400 | 631 | ~100 | 23.1 | 76.9 | 1180 | 33940 | 1.87 |
| PB8 | 50 | 20 | 25 | 400 | 631 | 102.6 | — | — | 1202 | 35200 | 1.70 |
| PB9 | 100 | 6 | 25 | 400 | 631 | 100.2 | 27.3 | 72.9 | 972.8 | 34190 | 1.39 |
| PB10 | 100 | 6 | 25 | 400 | 631 | 102.7 | 27.8 | 74.9 | 1096 | 33330 | 1.37 |
| PB11 | 100 | 6 | 25 | 400 | 631 | 97.6 | 32 | 65.6 | 1042 | 43560 | 1.36 |
| PB12 | 75 | 20 | 25 | 400 | 631 | 99.5 | 6 | 93.5 | 1647 | 24640 | 1.50 |
| PB13 | 75 | 20 | 25 | 400 | 631 | 100.3 | 3.5 | 96.8 | 1653 | 25340 | 1.45 |
| PB14 | 75 | 20 | 25 | 400 | 631 | 103.7 | 11.1 | 92.6 | 1582 | 25260 | 1.43 |
| PB15 | 120 | 6 | 25 | 400 | 631 | 102.6 | 97.3 | 5.3 | 369.6 | 22400 | 1.32 |
| PB16 | 120 | 6 | 25 | 400 | 631 | 101.6 | 90.3 | 11.3 | 380.2 | 25800 | 1.31 |
| PB17 | 120 | 6 | 25 | 400 | 631 | 101.5 | 92.8 | 8.7 | 332.6 | 24110 | 1.28 |

Other Embodiments

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A method comprising treating an iron sulfide scale, the method comprising:
    contacting the iron sulfide scale with an oxidizing composition comprising:
        a first oxidizer comprising ammonium persulfate, wherein the ammonium persulfate has a concentration of about 5 millimolar (mM) to about 1 molar (M) in the oxidizing composition; and
        a second oxidizer comprising sodium bromate, wherein the sodium bromate has a concentration of about 5 mM to about 2 M in the oxidizing composition.

2. The method of claim 1, wherein the sulfide scale comprises at least one of pyrite, pyrrhotite, troilite, greigite, mackinawite, and marcasite.

3. The method of claim 2, wherein the sulfide scale is pyrite.

4. The method of claim 1, wherein the sulfide scale is associated with downstream equipment present in a subterranean formation.

5. The method of claim 4, wherein the downstream equipment comprises at least one of a pipe, pipeline, or a vessel.

6. The method of claim 1, wherein the oxidizing composition comprises ammonium acetate.

7. The method of claim 1, wherein the bromate comprises at least one of calcium bromate, magnesium bromate, potassium bromate, or sodium bromate.

8. The method of claim 7, wherein the bromate comprises sodium bromate.

9. The method of claim 1, wherein the persulfate comprises ammonium persulfate and the bromate comprises sodium bromate.

10. A method of treating an iron sulfide scale comprising contacting the sulfide scale with an oxidizing composition comprising:
ammonium persulfate; and
sodium bromate,
wherein the ammonium persulfate is an oxidizer and has a concentration of about 5 mM to about 1 M in the oxidizing composition and the sodium bromate is an oxidizer and has a concentration of about 5 mM to about 2 M in the oxidizing composition.

11. The method of claim 10, wherein the treating the sulfide scale occurs at a temperature of about 60° C. to about 200° C.

12. The method of claim 10, wherein the treating the sulfide scale occurs for a time of less than about 96 hours.

13. A method of treating an iron sulfide scale comprising contacting the sulfide scale with an oxidizing composition comprising:
ammonium persulfate; and
sodium bromate,
wherein the ammonium persulfate has a concentration of about 5 mM to about 1 M and the sodium bromate has a concentration of about 5 mM to about 2 M.

* * * * *